(12) United States Patent
Herr et al.

(10) Patent No.: US 12,059,794 B2
(45) Date of Patent: Aug. 13, 2024

(54) HAND-HELD POWER TOOL

(71) Applicant: Robert Bosch GmbH, Stuttgart (DE)

(72) Inventors: Tobias Herr, Stuttgart (DE); Jens Blum, Filderstadt (DE); Simon Erbele, Nufringen (DE)

(73) Assignee: Robert Bosch GmbH, Stuttgart (DE)

( * ) Notice: Subject to any disclaimer, the term of this patent is extended or adjusted under 35 U.S.C. 154(b) by 114 days.

(21) Appl. No.: 17/493,435

(22) Filed: Oct. 4, 2021

(65) Prior Publication Data

US 2022/0111506 A1 Apr. 14, 2022

(30) Foreign Application Priority Data

Oct. 8, 2020 (DE) .................. 10 2020 212 708.5

(51) Int. Cl.
*B25F 5/02* (2006.01)
*B23Q 17/24* (2006.01)

(52) U.S. Cl.
CPC ............ *B25F 5/02* (2013.01); *B23Q 17/2404* (2013.01)

(58) Field of Classification Search
CPC .............................. B25F 5/02; B23Q 17/2404
See application file for complete search history.

(56) References Cited

U.S. PATENT DOCUMENTS

| | | | |
|---|---|---|---|
| 10,478,950 B2 | 11/2019 | Nagasaka et al. | |
| 2005/0121209 A1* | 6/2005 | Shimizu | B25B 21/00 |
| | | | 173/217 |
| 2013/0105188 A1* | 5/2013 | Sakamaki | B25F 5/008 |
| | | | 173/170 |
| 2014/0008088 A1* | 1/2014 | Chellew | B25F 5/021 |
| | | | 362/559 |
| 2014/0151079 A1* | 6/2014 | Furui | B25F 5/00 |
| | | | 173/171 |
| 2016/0008961 A1* | 1/2016 | Takano | B25F 5/00 |
| | | | 173/2 |
| 2016/0354889 A1* | 12/2016 | Ely | B23Q 17/2404 |
| 2017/0151657 A1* | 6/2017 | Nagasaka | B25F 5/02 |
| 2020/0223038 A1* | 7/2020 | Araki | B25B 23/18 |
| 2022/0063081 A1* | 3/2022 | Tominaga | B25B 23/045 |
| 2022/0071041 A1* | 3/2022 | Genz | H05K 5/0017 |

FOREIGN PATENT DOCUMENTS

| | | |
|---|---|---|
| DE | 20 2012 005 736 U1 | 8/2012 |
| DE | 20 2014 006 507 U1 | 10/2014 |
| DE | 10 2015 226 088 A1 | 6/2017 |
| DE | 10 2016 206 050 A1 | 10/2017 |
| DE | 10 2017 223 818 A1 | 6/2019 |
| DE | 10 2018 208 048 A1 | 11/2019 |
| DE | 10 2020 107 740 A1 | 9/2020 |
| WO | 2014/186911 A1 | 11/2014 |
| WO | 2015/061370 A1 | 4/2015 |

* cited by examiner

*Primary Examiner* — Lucas E. A. Palmer
(74) *Attorney, Agent, or Firm* — Maginot, Moore & Beck LLP

(57) ABSTRACT

A hand-held power tool includes a drive unit actuatable via at least one manual switch, a control unit at least for controlling the drive unit, the control unit having a control-unit housing. The power tool further includes at least one user interface having at least one operating element, and a housing that at least partially accommodates the control unit and the user interface. The hand-held power tool also includes a positioning device, the user interface being supported on the control-unit housing by use of the positioning device.

12 Claims, 9 Drawing Sheets

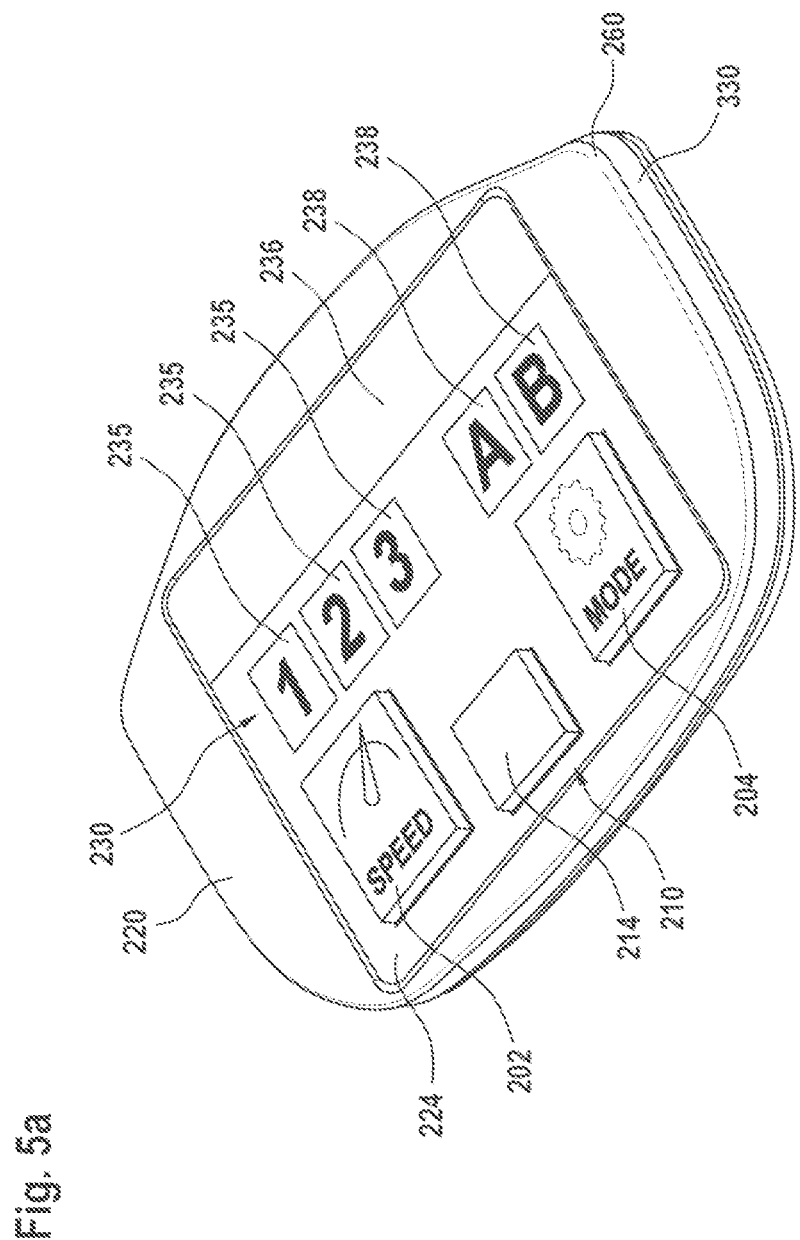

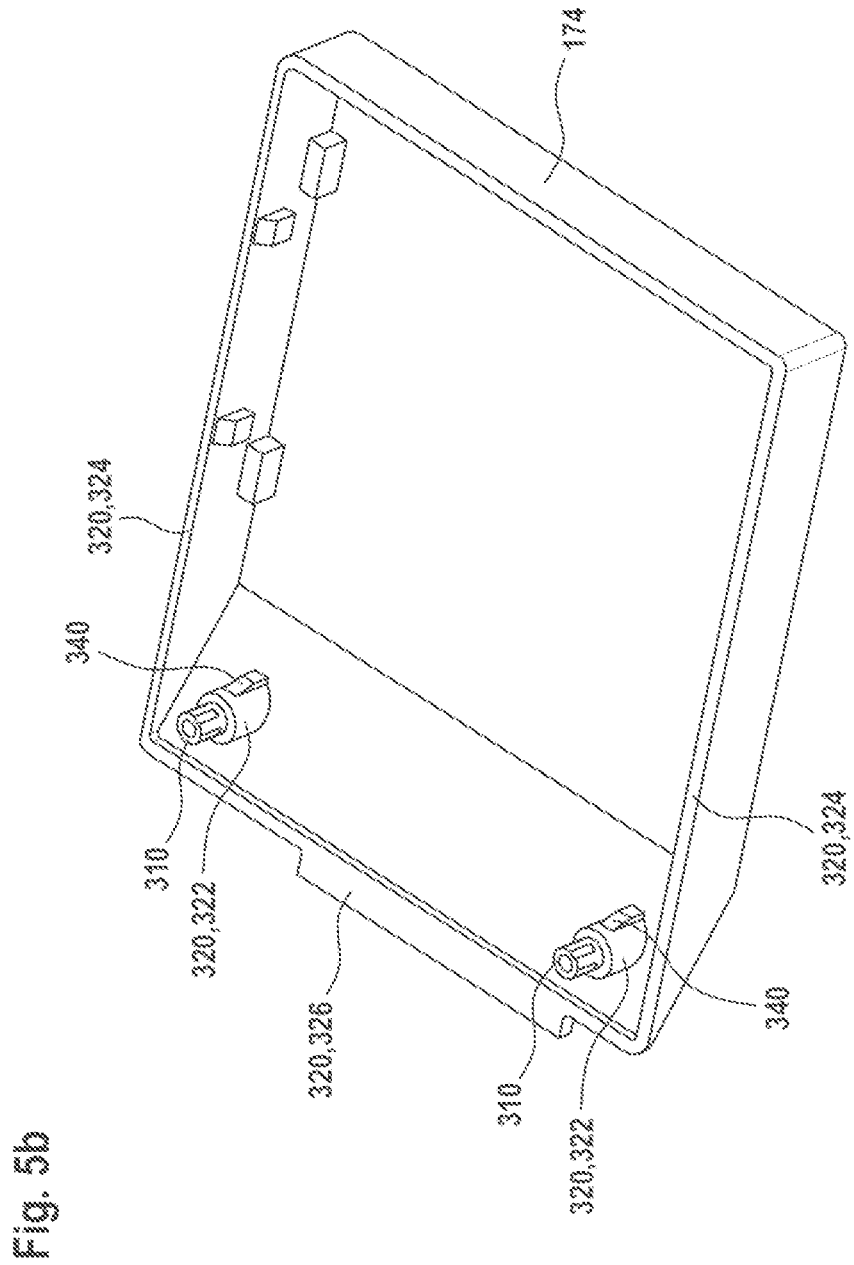

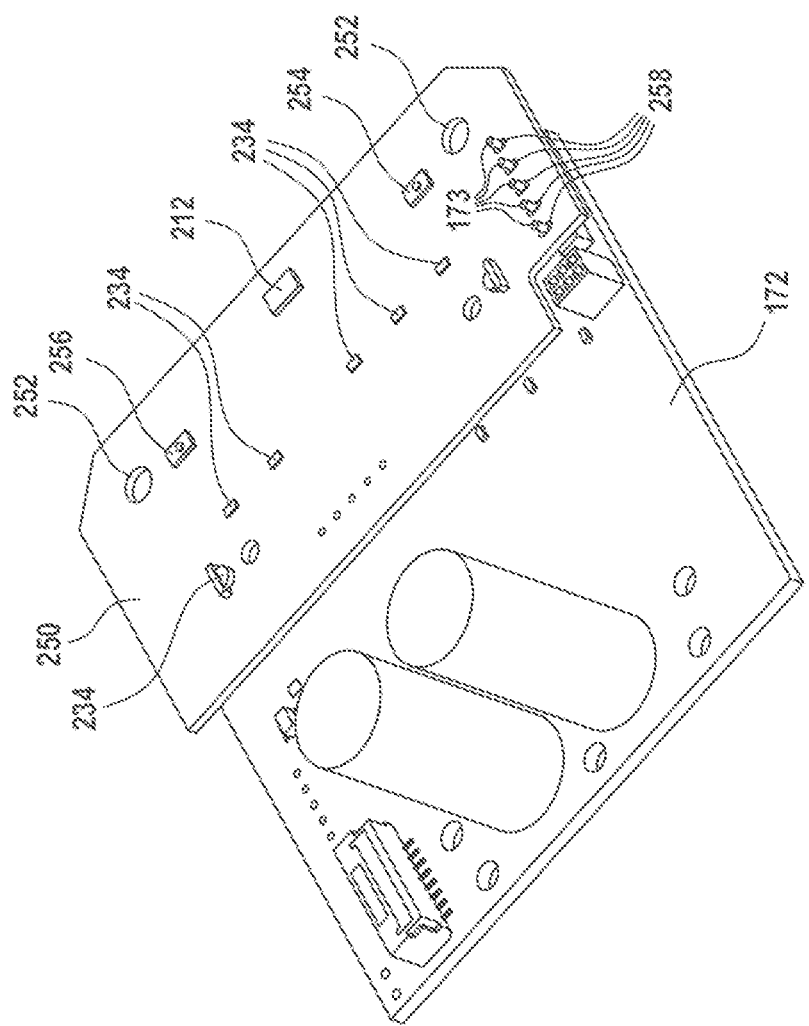

HAND-HELD POWER TOOL

This application claims priority under 35 U.S.C. § 119 to application no. DE 10 2020 212 708.5, filed on Oct. 8, 2020 in Germany, the disclosure of which is incorporated herein by reference in its entirety.

The present disclosure relates to a hand-held power tool.

BACKGROUND

There is already known from the prior art a hand-held power tool having a drive unit, a housing and at least one user interface. The drive unit is actuatable by means of at least one manual switch. The user interface comprises at least one operating element.

SUMMARY

The present disclosure is based on a hand-held power tool having a drive unit, the drive unit being actuatable by means of at least one manual switch, having a control unit at least for controlling the drive unit, the control unit having a control-unit housing, having at least one user interface, the user interface comprising at least one operating element, and having a housing, the housing at least partially accommodating the control unit and the user interface. It is proposed that the hand-held power tool have a positioning device, the user interface being supported on the control-unit housing by use of the positioning device.

The disclosure provides a compact hand-held power tool by providing a positioning device that supports a user interface on a control-unit housing. In particular, the disclosed hand-held power tool makes it possible for a housing of the hand-held power tool to have a low base height.

The hand-held power tool may be realized as an electrically or pneumatically operated hand-held power tool. The electrically operated hand-held power tool in this case may be realized as a mains-operated or as a battery-operated hand-held power tool. For example, the hand-held power tool may be realized as a screwdriver, a pneumatic screwdriver, a drill/driver, a rotary impact screwdriver, a hammer, a hammer drill, a pneumatic rotary impact screwdriver, or an impact drill/driver.

The drive unit is designed in such a way that it can be actuated via the manual switch. When the manual switch is actuated by a user, the drive unit is switched on and the hand-held power tool is put into operation. Accordingly, when the manual switch is no longer actuated by the user, the drive unit is switched off. Preferably, the drive unit can be electronically controlled by open-loop and/or closed-loop control in such a manner that a reversing mode and a presetting for a desired rotational speed can be realized. It is also conceivable that the manual switch is a latchable manual switch that can be latched in at least one position in at least one actuation state. In the reversing mode, the drive unit may be switchable between a clockwise direction of rotation and a counter-clockwise direction of rotation. For the purpose of switching over the drive unit in the reversing mode, the hand-held power tool may comprise a direction-of-rotation switchover element, in particular a direction-of-rotation switch.

The drive unit comprises at least one drive motor, and in one embodiment may have at least one transmission. The drive motor may in particular be realized as at least one electric motor. The transmission may be realized as at least one planetary gear set, and may be shiftable, for example. In the case of a shiftable transmission, it is possible to shift over between at least two gear ratios by means of at least one gear switchover element, in particular a gear shifter. The disclosure may also be applied to other types of motors or transmissions. The hand-held power tool additionally comprises a power supply, the power supply being designed for battery operation by means of rechargeable batteries, in particular hand-held power-tool battery packs, and/or for mains operation. In a preferred embodiment, the power supply is designed for battery operation. In the context of the present disclosure, a "hand-held power-tool battery pack" is to be understood as an assembly of at least one battery cell and a battery-pack housing. The hand-held power-tool battery pack is advantageously designed for supplying power to commercially available battery-powered hand-held power tools. The at least one battery cell may be realized, for example, as a Li-ion battery cell having a nominal voltage of 3.6 V. The hand-held power-tool battery pack may comprise, for example, up to ten battery cells, although a different number of battery cells is also conceivable. An embodiment as a battery-operated hand-held power tool as well as operation as a mains-operated hand-held power tool are sufficiently known to persons skilled in the art, for which reason the details of the power supply are not discussed here.

The hand-held power tool may have an impact mechanism. The impact mechanism generates high torque peaks during operation in order to loosen seized fasteners or to tighten fasteners. The impact mechanism may be connected to the drive motor by means of the transmission. The impact mechanism may be realized, for example, as a rotary impact mechanism, a latching impact mechanism, a torsional impact mechanism or a hammer impact mechanism.

The hand-held power tool may have a tool receiver for receiving an insert tool. The tool receiver may be realized as an internal tool receiver, such as a bit receiver, an external tool receiver, such as a socket receiver, or a drill chuck. The tool receiver may receive insert tools such as, for example, drill bits or sockets, so that a user can make threaded connections between a fastener and a fastener holder.

The control unit of the hand-held power tool is designed at least for controlling the drive unit. The control unit in this case may receive switching signals generated by means of the manual switch. It is conceivable for the control unit to process the switching signals of the manual switch before the control unit forwards the switching signals to the drive unit for control. Moreover, the control unit is designed to receive user-interface signals from the user-interface, and to process and output these signals. The control unit processes the user-interface signals into at least one output signal and outputs the latter. The output signal may then be sent to the user-interface and/or control the drive unit by open-loop and/or closed-loop control. The control unit may comprise at least one microprocessor or microcontroller.

The hand-held power tool comprises the user interface with the operating element. In particular, the user interface is located on the housing. The user interface may be an interface between the user and the hand-held power tool. The operating element is designed to receive inputs made by the user. Advantageously, the operating element serves at least for setting at least one operating mode, in particular a rotational speed level, and/or at least for controlling a workspace illumination unit by open-loop and/or closed-loop control. It is conceivable that the operating element can also be configured to set an operating mode that can be assigned by the user. Furthermore, the operating element may also be used to set a further operating mode considered appropriate by persons skilled in the art.

The user interface may include the workspace illumination unit. The workspace illumination unit comprises a light source and a light-guide element. The workspace illumination unit is designed to emit light. Further, the light is preferably emitted to a workspace area located directly in front of the hand-held power tool.

Both the workspace area and the insert tool may be illuminated in this case. The light source may be, for example, at least one LED. The light is emitted by the light source. The light-guide element is designed to guide light. Further, the light-guide element is designed to refract the light and guide it onto the workspace area. Preferably, the light-guide element may be realized as a light focusing element, in particular a focusing lens. It is conceivable for the light source and the light-guide element to be formed in one piece, in one embodiment for the at least one LED to realize the light focusing element, in particular the focusing lens.

The user interface may convert the inputs made by the user into a user signal, in particular an electrical signal. The user interface may then forward the user signal to the control unit. The user-interface may also indicate information by means of at least one indicator element. Advantageously, the user interface comprises the indicator element. The indicator element is designed to indicate at least one item of information relating to an operating state, the operating mode and/or an item of operating information. The indicator element may be realized as a light source and/or as a display, or further indicator elements considered appropriate by persons skilled in the art. In one embodiment, the indicator element may comprise three LEDs for indicating the rotational speed level.

The operating state may be, for example, "switched-on" or "switched-off". The operating mode may be, for example, at least one rotational speed, at least one rotational speed level, or at least one impact energy. Examples of items of operating information include "pairing with an electrical device", "connected to an electrical device", "not connected to an electrical device", or at least a battery charge level. In addition, other examples of operating states, operating modes and/or items of operating information, as considered appropriate by persons skilled in the art, are also possible.

In one embodiment, the user interface comprises at least one further operating element. In a manner similar to the operating element, the further operating element may serve at least for setting at least one operating mode, in particular a rotational speed level, and/or at least for controlling the workspace illumination unit by open-loop and/or closed-loop control. In this case, the operating element and/or the further operating element may switch the workspace illumination unit on or off, as well as increase or decrease a lighting power, in particular a brightness, continuously or incrementally.

The operating element is an operating element that can be actuated by the user and via which the user can change at least the operating state, the operating mode and/or the operating information.

The operating element may be realized as at least one press-action element, as at least one sliding element, as at least one rotary element or, alternatively, as at least one tilting element. Further embodiments of the at least one operating element are also conceivable. The at least one press-action element is designed to be pressed by a user. The at least one sliding element is designed to be slid by a user. The at least one rotating element is designed to be rotated by a user. The at least one tilting element is designed to be tilted by a user. Depending on the embodiment, a combination of the said operating elements is also possible.

In one embodiment, the operating element and/or the further operating element comprise/comprises at least one restoring element. The restoring element is designed to guide the operating element and/or the further operating element into at least one neutral position. The neutral position is characterized in that the operating element and/or the further operating element can be actuated in the neutral position. In particular, the restoring element has at least one restoring action, such that, following the at least one actuation, the operating element and/or the further operating element are/is guided into the neutral position. The operating element and/or the further operating element are/is then in the neutral position, such that at least one subsequent actuation becomes possible. Preferably, the restoring element is realized as at least one spring element. The spring element may be realized as a dome-shaped spring, a spiral spring, a hinge-like lever or the like.

The housing accommodates the control unit and the user interface, at least partially. "At least partially" in this case is to be understood to mean that the housing accommodates at least part of the control unit and of the user interface. The housing comprises at least one receiver for the control unit. The receiver for the control unit in this case at least partially encompasses the control-unit housing. The receiver for the control unit is realized here, by way of example, in the form of ribs. Here, as an example, the ribs are formed in one piece with the housing. The control-unit housing is designed at least for locating the control unit in the housing. The control-unit housing may be shaped in the manner of a dish, a cup, a disk or the like. In addition, the housing accommodates the drive unit and the optional impact mechanism.

In one embodiment, the housing comprises at least one power-supply holding device, in particular a hand-held power-tool battery-pack holding device, on which the user interface is located. The power-supply holding device is in particular designed to hold, in particular to receive, the power supply, in particular the hand-held power-tool battery pack. In addition, the power-supply holding device is designed to connect the power supply, in particular the hand-held power-tool battery pack, to the housing so that it can be detached without use of tools, and to supply power to the hand-held power tool. The power-supply holding device, together with a connected hand-held power-tool battery pack, forms at least one stand base that has at least one standing surface. In particular, the hand-held power tool can be stored, in particular placed, on a standing surface by means of the stand base. The housing additionally comprises a handle. The handle is designed to be grasped by the user in order to use the hand-held power tool. In particular, the power-supply holding device is located on the handle.

The user interface is advantageously located on the power-supply holding device. In particular, the user interface is located on the power-supply holding device in such a way that the workspace illumination unit of the user interface can provide the greatest possible illumination of the workspace area.

Alternatively, the user interface may also be located on the handle, in particular in the region of the manual switch, or alternatively next to a tool receiver.

The hand-held power tool comprises the positioning device. The positioning device is designed to support the user-interface on the control-unit housing. For this purpose, the user interface may bear, in particular directly or immediately, against the positioning device. The positioning device is designed to locate the user interface relative to the control-unit housing and to hold it in a relative position. The "relative position" in this case is to be understood to mean a position, in particular arrangement, of the user-interface relative to the control-unit housing in the housing. The positioning device may locate and hold the user-interface positioned at a predetermined angle and/or a predetermined distance with respect to the control-unit housing.

In one embodiment of the hand-held power tool, the positioning device has at least one positioning element, the positioning element being designed to locate the user interface so as to at least partially overlap the control unit. The positioning element is realized in such a manner that the user interface at least partially overlaps the control-unit housing. Here, "so as to at least partially overlap" is to be understood to mean that at least a portion of the user interface overlaps the control unit, in particular the control-unit housing. Moreover, the positioning element is designed to locate and keep the user-interface positioned in the relative position with respect to the control unit, in particular the control-unit housing. It is conceivable for a plurality of positioning elements to be provided, for example two, three or more than three.

In one embodiment of the hand-held power tool, the positioning element engages at least partially in the user interface. The positioning element thereby positions the user interface relative to the control unit, in particular the control-unit housing. The user-interface may comprise at least one receiver in which the positioning element at least partially engages. The positioning element may in this case realize a positive and/or non-positive connection to the user interface, in particular the receiver of the user interface.

In an alternative embodiment, it is also conceivable for the positioning element to realize a materially bonded connection to the user interface.

In one embodiment of the hand-held power tool, the user-interface has a user-interface circuit board, the user-interface circuit board comprising at least one through-opening, and the positioning element being designed to extend through the through-opening. The user-interface circuit board is designed to convert the inputs made by the user into the user signal. For this purpose, the user-interface circuit board may have at least one microprocessor or microcontroller. The user-interface circuit board may comprise at least one switching element and at least one light element. The switching element may be formed as a push-button or a switch. The switching element is designed to be actuated by the operating element. It is conceivable for the user-interface circuit board to comprise at least one further switching element. The further switching element is designed to be actuated by the further operating element. The light element of the workspace illumination unit may be located on the user-interface circuit board.

The positioning element may locate the user-interface circuit board relative to the control unit, in particular the control-unit housing, in that the positioning element extends through the through-opening. The user-interface circuit board realizes the through-opening. The through-opening in this may be formed, for example, as a recess, as a through-hole or the like. The through-opening may be formed at substantially any position on the user-interface circuit board. Moreover, a plurality of through-openings may also be provided, such as two or three, for example. The through-opening in this case may be circular, oval, polygonal, slot-like or the like. The through-opening is designed to receive the positioning element in such a manner that the positioning element can extend through the through-opening. It is conceivable for the positioning element and the through-opening to realize a positive and/or non-positive connection.

In one embodiment of the hand-held power tool, the user interface has at least one carrier element, the carrier element comprising at least one receiving element, and the positioning element engaging in the receiving element of the carrier element. The positioning element positions the carrier element relative to the control unit, in particular the control-unit housing, by the positioning element engaging the carrier element. The carrier element comprises the receiving element, which may be realized, for example, as a receiver, an opening, a notch, a groove or the like. The receiving element in this case may be shaped, for example, in the manner of a cup or dish. It is conceivable for the receiving element to constitute one piece with the carrier element. The carrier element may comprise the light-guide element of the workspace illumination unit, the operating element and/or the further operating element. It is conceivable for carrier element to be moulded around the light-guide element. Further, it is conceivable for carrier element to be moulded around the indicator element. Moreover, it is possible for the operating element and/or the further operating element to constitute one piece with the carrier element. It is conceivable for the carrier element to comprise a plurality of receiving elements, such as two or three, for example.

The positioning element may realize a positive and/or non-positive connection to the receiving element of the carrier element. For example, the positioning element in this case may realize a snap connection, hook connection, latching connection, screwed connection, bayonet connection or plug-and-socket connection to the receiving element of the carrier element.

It is also conceivable for the positioning element to form a materially bonded connection to the carrier element.

In one embodiment of the hand-held power tool, the positioning element is realized in the manner of a pin. In this case, the positioning element may be shaped, for example, in the manner of a pin, a rod or the like. It is possible for the positioning element to have a cylindrical shape or a polygonal shape.

For example, two pin-like positioning elements may be provided, which extend through two through-openings of the user-interface circuit board and engage two receiving elements of the carrier element.

In this exemplary embodiment, the user interface comprises the carrier element and the user-interface circuit board. The carrier element in this case comprises the operating element, the further operating element, the indicator element and the light guide element. The operating element and the further operating element in this case are formed as hinge-like levers. Here, the carrier element is moulded around the indicator element and the light-guide element. The user-interface circuit board comprises the switching element, the further switching element and the light element. Here, the carrier element bears against the user-interface circuit board. It is conceivable, however, for the carrier element to realize a positive, non-positive and/or materially bonded connection to the user-interface circuit board. It is further conceivable for the carrier element to be plugged onto the user-interface circuit board. It is possible for the carrier element to be supported on the user-interface circuit board via another component such as, for example, a seal.

In one embodiment of the hand-held power tool, the positioning element at least partially encompasses the user interface, in particular the carrier element and/or the user-interface circuit board. The positioning element positions the user interface, in particular the carrier element and/or the user-interface circuit board, relative to the control unit, in particular the control-unit housing, by the positioning element at least partially encompassing the user interface. Here, "at least partially encompassing" is to be understood to mean that the positioning element at least partially surrounds the user-interface and at bears least partially against the user-interface. The positioning element in this case may realize, for example, form a positive, non-positive and/or materially bonded connection to the user-interface. It is also conceivable for the positioning element to at least partially encompass the carrier element or the user-interface circuit board.

In one embodiment of the hand-held power tool, the positioning element is realized as an at least partially circumferential frame. The positioning element can thereby position the user interface, in particular the carrier element and/or the user-interface circuit board, relative to the control unit, in particular relative to the control-unit housing. The at least partially circumferential frame may bear against the user-interface, in particular the carrier element and/or the user-interface circuit board.

In one embodiment of the hand-held power tool, the positioning device has at least one support element, the user interface, in particular the carrier element and/or the user-interface circuit board, bearing against the support element, and the support element being designed to divert occurring operating forces into the housing. The user interface, in particular the carrier element and/or the user-interface circuit board, bear/bears against the support element. The support element is designed to absorb the occurring operating forces and thereby prevent the user interface, in particular the carrier element and/or the user-interface circuit board, from bending when actuated by the user. The occurring operating forces may be caused, for example, by pressing, sliding, pulling or rotating the operating element and/or the further operating element. The support element is operatively connected to the housing, such that the support element can divert the occurring operating forces to the housing.

It is conceivable for the support element to be operatively connected to the control-unit housing, such that the support element diverts the occurring operating forces to the control-unit housing. The control-unit housing may be operatively connected to the housing, such that the occurring operating forces can be diverted from the control-unit housing to the housing. It is possible for the control-unit housing to bear against the housing.

The support element may formed, for example, as a shoulder, in particular a circumferential shoulder, as an edge, in particular a circumferential edge, as a collar, in particular a circumferential collar, as a web, as a projection, in particular a circumferential projection, as a pin, as a rod, as a pedestal or the like. A plurality of support elements may also be provided, such as two, three, four or five, for example.

In one embodiment, the positioning element and the support element are formed in one piece. A stable positioning device can thus be provided.

In one embodiment of the hand-held power tool, the positioning device has a further positioning element, for centering the user interface, in particular the carrier element and/or the user-interface circuit board, relative to a housing opening, and the user interface, in particular the carrier element and/or the user-interface circuit board, has a connection element, the connection element being designed to receive the further positioning element. The housing comprises the housing opening. The housing opening may be located next to the stand base of the housing. The housing opening may have, for example, a round, oval or polygonal shape. The further positioning element is designed to center the user interface, in particular the carrier element and/or the user-interface circuit board, relative to the housing opening. The further positioning element may position the user-interface, in particular the carrier element and/or the user-interface circuit board, relative to the housing opening and additionally relative to the control unit, in particular the control-unit housing. This enables the user-interface, in particular the carrier element and/or the user-interface circuit board, to be centered relative to the housing opening and additionally relative to the control unit, in particular the control-unit circuit board. The further positioning element may be formed, for example, as an at least partially circumferential edge, an at least partially circumferential web, an O-ring, a pin, a rod or the like. The connection element is designed to receive the further positioning element. The further positioning element in this case may bear against the connection element. Further, the connection element may realize a positive and/or non-positive connection to the further positioning element. The connection element may be formed, for example, as a receiver, a recess, an opening, an at least partially circumferential groove, an at least partially circumferential surface, an at least partially circumferential frame or the like.

Alternatively or additionally, the housing may realize the further positioning element. In this case, the further positioning element may then be formed, for example, as an at least partially circumferential projection, an at least partially circumferential web or the like. The connection element of the user interface, in particular of the carrier element and/or of the user-interface circuit board, may then be realized as an at least partially circumferential frame or as an at least partially circumferential surface.

In one embodiment of the hand-held power tool, the positioning device has at least one delimiting element, and the control unit comprises a control-unit circuit board, the control-unit circuit board bearing against the delimiting element, and the delimiting element being designed to locate the control-unit circuit board relative to the user interface, in particular the carrier element and/or the user-interface circuit board. The delimiting element may be formed, for example, as a slope, a rib, an abutment, a surface, a web, a pin, a pedestal, an edge, a collar, a shoulder, or the like. The delimiting element positions the control-unit circuit board relative to the user-interface, in particular the carrier element and/or the user-interface circuit board, and/or to the control-unit housing, in that the control-unit circuit board bears against the delimiting element. It is conceivable for a plurality of delimiting elements to be provided, such as two, three or four, for example.

As described above, the control unit may receive and process the switching signals, the user-interface signals and the output signals. For this purpose, the control unit comprises the control-unit circuit board. The control-unit circuit board may comprise at least one microprocessor or microcontroller. Here, the control unit comprises the control-unit housing and the control-unit circuit board. The control-unit housing in this case accommodates the control-unit circuit board.

In one embodiment, the support element and the delimiting element are formed in one piece. It is also conceivable for the support element, the delimiting element and the positioning element to be formed in one piece. This makes it possible to provide a positioning device that is both stable and compact.

In one embodiment of the hand-held power tool, the user interface, in particular the user-interface circuit board, is connected to the control unit, in particular the control-unit circuit board, in an electrically conductive manner. The user interface may be connected to the control unit in an electrically conductive manner by means of a plug-and-socket connection, a cable connection or a soldered connection. In the case of the plug-and-socket connection, for example, the user interface comprises at least one plug connector, and the control unit comprises at least one coupling corresponding to the plug connector. When the plug connector is connected to the coupling, the user interface can be connected to the control unit in an electrically conductive manner. It is also conceivable for the user interface to comprise at least one coupling, and for the control unit to comprise at least one plug connector for electrical conduction. In the case of the cable connection, the user interface and the control unit may be connected in an electrically conductive manner by means of at least one cable. The cable in this case may, for example, be soldered to the user interface and the control unit. In the case of the soldered connection, the user interface and the control unit may be electrically connected to one another via soldered pins.

The user interface, in particular the user-interface circuit board, has at least one opening for the control unit, in particular the control-unit circuit board. The control unit, in particular the control-unit circuit board, has at least one pin for the user interface. The pin for the user-interface is designed to engage in the opening for the control unit and to realize an electrical connection. The pin for the user-interface may be soldered to the user-interface, in particular the user-interface board, using the opening for the control unit. It is conceivable for the pin for the user interface, in particular the user-interface circuit board, to realize a positive and/or non-positive connection to the opening for the control unit, in particular the control-unit circuit board, in order to connect the user interface to the control unit in an electrically conductive manner.

It is conceivable for the user interface, in particular the user-interface circuit board, to have a plurality of openings for the control unit, such as two, three, four or more than four, for example. It is further conceivable for the control unit, in particular the control-unit circuit board, to have a plurality of pins for the user-interface, such as two, three, four or more than four, for example. In this case, the plurality of openings for the control unit corresponds to the plurality of pins for the user interface.

It is possible, alternatively or additionally, for the user-interface circuit board to be connected to the control-unit circuit board via a potting compound. In this case, the control-unit housing may accommodate the potting compound. The potting renders possible a materially bonded connection between the control-unit circuit board and the user-interface circuit board.

In one embodiment of the hand-held power tool, the control-unit housing realizes the positioning device. In this case, the control-unit housing may then realize the positioning element, the support element and the delimiting element. It is also conceivable for the control-unit housing to be formed in one piece with the positioning element, the support element and the delimiting element. By realizing the positioning device, the control-unit housing can locate and hold the user-interface, in particular the carrier element and/or the user-interface circuit board, positioned relative to the control unit, in particular the control-unit circuit board. This enables the user interface, in particular the carrier element and the user-interface circuit board, to be mounted together with the control unit, in particular the control-unit housing and the control-unit circuit board, as a common module during assembling of the hand-held power tool. Assembling time for the hand-held power tool is thereby shortened and assembling is simplified, while at the same time a low base height is achieved. The low base height has the advantage that the hand-held power tool can also be used in constricted workplaces. In addition, a short tolerance chain is achieved between the user-interface circuit board and the carrier element, as the control-unit housing realizes the positioning device.

In one embodiment, the housing projects at least partially over the user interface. For this purpose, the housing has at least one projection, a web, an edge or the like. The housing thereby locates the user-interface, in particular the carrier element and/or the user-interface circuit board, between the housing and the control unit, in particular the control-unit housing and/or the control-unit circuit board. For this purpose, the housing may have at least one compression rib. The compression rib is designed to apply a force to the user interface, in particular the carrier element and/or the user-interface circuit board, in the direction towards the control unit, such that the user interface can be located substantially without play within the housing. The housing can thus additionally locate and position the user-interface, in particular the carrier element and/or the user-interface circuit board, relative to the control unit, in particular the control-unit housing and/or the control-unit circuit board. It is conceivable for the user-interface, in particular the carrier element, to comprise an operator control membrane. The operator control membrane may comprise control icons, the control icons being provided to indicate to the user items of information relating the hand-held power tool. The items of information relating to the hand-held power tool may be, for example, the operating modes of the hand-held power tool, the rotational speed levels, or the like. The housing may project over the user interface in such a manner that the housing bears at least partially against the operator control membrane. It is conceivable for the operator control membrane to be at least partially recessed in the carrier element.

In an alternative embodiment, the housing may clamp the user interface onto the control unit, in particular the control-unit housing, via the operator control membrane. In addition, the operator control membrane may in this case reduce friction between the housing and the user interface, in particular the carrier element.

In an alternative embodiment, the user interface, in particular the carrier element, realizes the positioning element, and the positioning element engages in a receiver of the control-unit housing. The user interface, in particular the carrier element, may realize the positioning element, for example, in the manner of a pin, an edge, a web, a projection or the like. It is conceivable for the positioning element to be formed in one piece with the user interface, in particular the carrier element. The receiver of the control-unit housing may be realized, for example, in the manner of a dish, cup, groove, in the manner of an opening, in the manner of a receiver or the like. The positioning element may realize a positive and/or non-positive connection to the receiver of the control-unit housing in order to position the user-interface, in particular the carrier element and/or the user-interface circuit board, relative to the control unit, in particular the control-unit circuit board.

In an alternative embodiment, the housing realizes the positioning element, and the positioning element extends through the control unit, in particular the control-unit housing and/or the control-unit circuit board, into the user interface, in particular the user-interface circuit board and/or the carrier element. The housing may realize the positioning element, for example, in the manner of a pin, an edge, a web, a projection or the like. It is conceivable for the positioning element to be formed in one piece with the housing. The control unit, in particular the control-unit housing and/or the control-unit board, has at least one through-opening for the positioning element. The positioning element may realize a positive and/or non-positive connection to the through-opening of the control unit. The positioning element may extend through the through-opening of the control unit, in particular of the control-unit housing. Here, the user interface has a through-opening and a receiver for the positioning element. The user-interface circuit board in this case comprises the through-opening. The positioning element is designed to extend through the through-opening of the user-interface circuit board. The positioning element in this case may realize a positive and/or non-positive connection to the through-opening of the user-interface circuit board. Here, the carrier element comprises the receiver for the positioning element. The positioning element engages in the receiver of the carrier element. The positioning element may realize a non-positive and/or positive connection to the receiver of the carrier element. The receiver of the carrier element may be realized, for example, in the manner of a dish, cup, groove, in the manner of an opening, in the manner of a receiver or the like.

BRIEF DESCRIPTION OF THE DRAWINGS

The disclosure is explained below with reference to preferred embodiments. The drawings below show:

FIG. 5a a perspective view of a carrier element;

FIG. 5b a perspective view of a control-unit housing;

FIG. 5c a perspective view of a control-unit circuit board with a user-interface circuit board;

DETAILED DESCRIPTION

Figure 1:
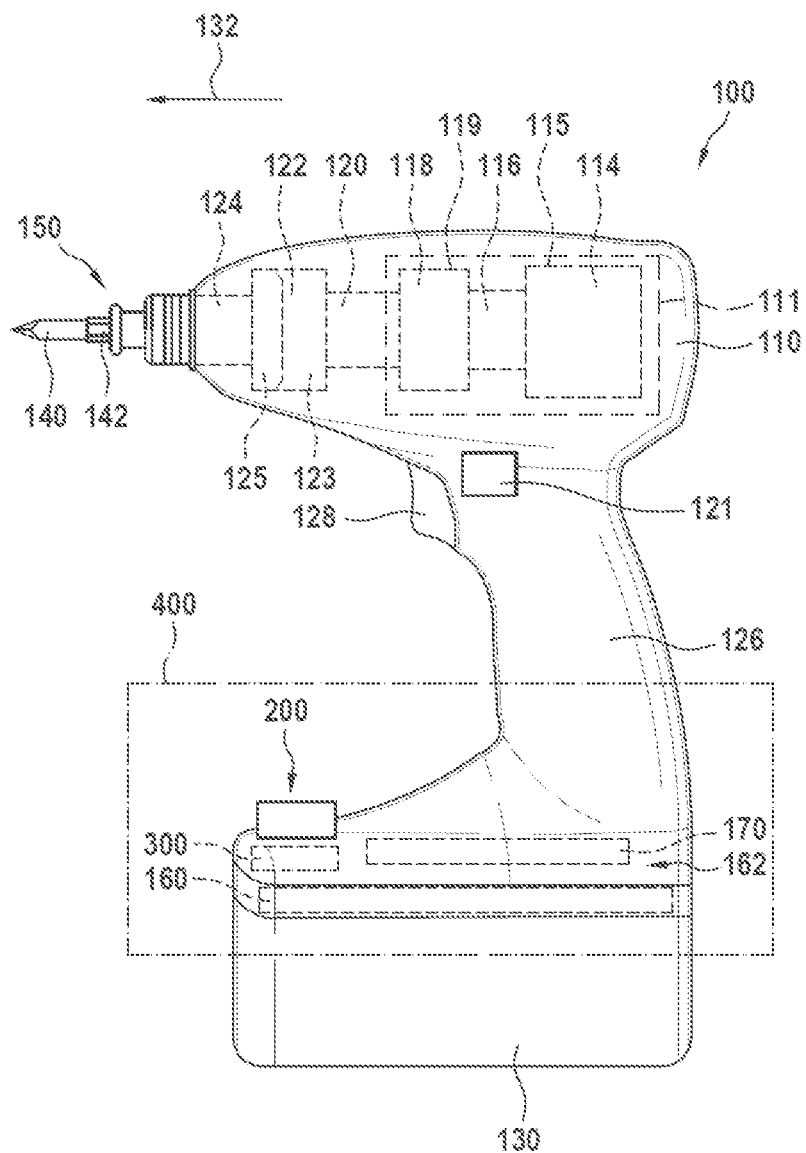
FIG. 1 a schematic view of a hand-held power tool according to the disclosure with a user interface.

FIG. 1 shows a hand-held power tool 100 according to the disclosure, realized here as an exemplary battery-operated rotary impact screwdriver. The hand-held power tool 100 comprises an output shaft 124, a tool receiver 150, and an exemplary impact mechanism 122, e.g. a rotary, or rotational, impact mechanism. The hand-held power tool 100 has a housing 110 that comprises a handle 126. The hand-held power tool 100 can be mechanically and electrically connected to a power supply for battery operation for a mains-independent electric power supply, such that the hand-held power tool 100 is realized as a battery-operated hand-held power tool 100. The power supply here is a hand-held power-tool battery pack 130. However, the present disclosure is not limited to battery-operated hand-held power tools, but may also be applied to mains-powered, i.e., mains-operated, hand-held power tools or pneumatically operated hand-held power tools.

Illustratively in this case, the housing 110 comprises a drive unit 111 and the impact mechanism 122. The drive unit 111 further comprises an electric drive motor 114, which is powered by the hand-held power-tool battery pack 130, and a transmission 118. The transmission 118 may be realized as at least one planetary gear set. The drive motor 114 is configured so that it can be actuated, for example, via a manual switch 128, such that the drive motor 114 can be switched on and off. The drive motor 114 may be any type of motor such as, for example, an electronically commutated motor, a brush motor, a DC motor or an AC motor. Advantageously, the drive motor 114 can be electronically controlled by open-loop and/or closed-loop control, such that a reversing operation, as well as a desired rotational speed, can be realized. For the reversing operation, the hand-held power tool 100 comprises a direction-of-rotation switchover element 121, which is realized as a direction-of-rotation. The direction-of-rotation switchover element 121 is designed to switch over the drive motor 114 between a clockwise direction of rotation and a counter-clockwise direction of rotation. The structure and operation of a suitable drive motor are sufficiently known to persons skilled in the art, and therefore will not be discussed in greater detail here.

The transmission 118 is connected to the drive motor 114 via a motor shaft 116. The transmission 118 is designed to convert a rotation of the motor shaft 116 into a rotation between the transmission 118 and the impact mechanism 122 via a drive member 120, such as a drive shaft. Preferably, this conversion is effected in such a manner that the drive member 120 rotates relative to the motor shaft 116 with increased torque but at a reduced rotational speed. Illustratively, there is a motor housing 115 assigned to the drive motor 114, and a transmission housing 119 assigned to the transmission 118. Both the motor housing 115 and the transmission housing 119 are arranged, exemplarily, in the housing 110. However, it is also conceivable for the drive motor 114 and the transmission 118 to be arranged directly in the housing 110 if the hand-held power tool 100 is realized in an "open frame" construction.

The impact mechanism 122 is connected to the drive member 120 and comprises, by way of example, an impact body 125 that generates high intensity impact-like rotary pulses. Via the impact body 125, these impact-like rotary pulses are transmitted to the output shaft 124, for example a work spindle. The impact mechanism 122 comprises an impact-mechanism housing 123, although the impact mechanism 122 may also be located in another suitable housing, such as the transmission housing 119. The exemplary impact mechanism 122 is designed to drive the output shaft 124. There is a tool receiver 150 provided on the output shaft 124. Preferably, the tool receiver 150 is formed and/or realized on the output shaft 124. Preferably, the tool receiver 150 is located in an axial direction 132 away from the drive unit 111. The tool receiver 150 is realized here as a hexagon socket, in the manner of a bit holder that is designed to receive an insert tool 140. The insert tool is formed in the manner of a screwdriver bit having a polygonal external coupling 142. The type of screwdriver bit, for example HEX type, is sufficiently known to persons skilled in the art. However, the present disclosure is not limited to a use of HEX type screwdriver bits, but other tool receivers considered appropriate by persons skilled in the art may also find application, such as, for example, HEX type drill bits, SDS quick-insert tools or round-shank drill chucks. In addition, the structure and functioning of a suitable bit holder are sufficiently known to persons skilled in the art.

The hand-held power tool 100 comprises the housing 110, a control unit 170 at least for controlling the drive unit 111, a user interface 200 and a positioning device 300 according to the disclosure. The housing 110 at least partially accommodates the control unit 170 and the user interface 200. The user interface 200 comprises an operating element 202 and a further operating element 204 and a workspace illumination unit 210, see also FIGS. 2 to 5. The operating element 202 and the further operating element 204 can receive inputs made by a user. The control unit 170 has a control-unit circuit board 172 and a control-unit housing 174, see also FIGS. 2 to 6. The control-unit housing 174 accommodates the control-unit circuit board 172. The control-unit circuit board 172 has at least one microcontroller.

The control unit 170 receives switching signals generated by use of the manual switch 128. In addition, the control unit 170 processes the switching signals from the manual switch 128 before the control unit 170 forwards the switching signals to the drive unit 111. Additionally, the control unit 170 receives user-interface signals from the user-interface 200. The user-interface signals are generated by the inputs made by the user via the operating element 202 and/or the further operating element 204. The control unit 170 processes the user-interface signals into at least one output signal, and outputs the latter. The output signal is sent to the user interface 200 and/or the drive unit 111.

The housing 110 additionally comprises a power-supply holding device 160. Further, the user-interface 200 is arranged on the power-supply holding device 160, see also FIG. 2. The power-supply holding device 160 accommodates the hand-held power-tool battery pack 130, forming a stand base 162 that has a standing surface. The hand-held power-tool battery pack 130 is detachable from the power-supply holding device 160 without use of tools. Further, the housing 110 comprises the handle 126 and the power-supply holding device 160. The handle 126 can be grasped by the user. In one embodiment, the power-supply holding device 160 is located on the handle 126. The hand-held power tool 100 can be set down by means of the stand base 162. In this embodiment, the user interface 200 is located on the power supply holding unit 160.

Figure 2:
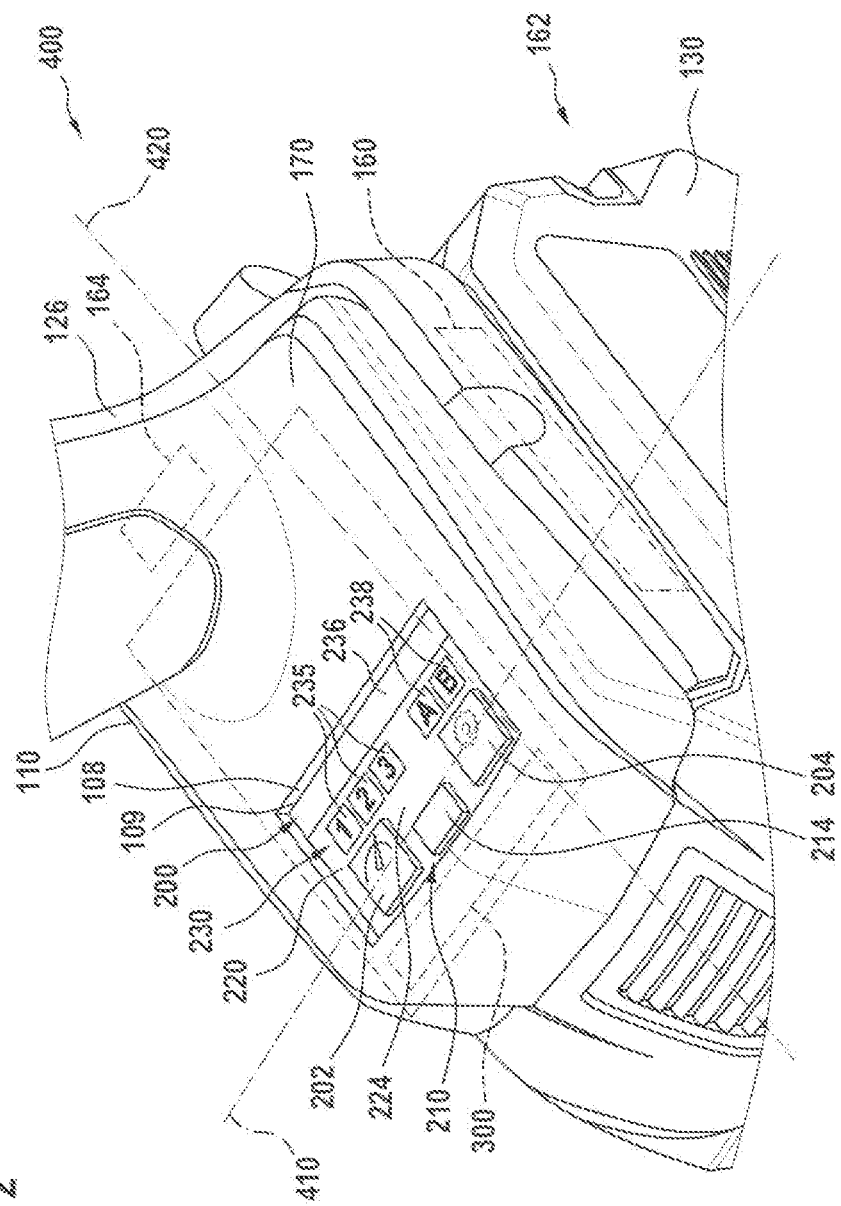
FIG. 2 a perspective detail of the hand-held power tool with the user interface.

Represented in FIG. 2 is a perspective detail 400 of the hand-held power tool 100 with the user-interface 200. The housing 110 at least partially accommodates the control unit 170 and the user interface 200. The housing 110 in this case comprises at least one receiver 164, not represented in greater detail, for the control unit 170. The receiver 164 for the control unit 170 at least partially encompasses the control-unit housing 174. The receiver 164 for the control unit 170 is exemplarily realized as ribs, and is formed in one piece with the housing 110. Here, the operating element 202 is provided for setting a rotational speed level of the drive unit 111, and the further operating element 204 is provided for setting an operating mode. The user interface 200 further comprises a indicator element 230, which can indicate a selection of the rotational speed level of the drive unit 111 and the set operating mode.

Figure 3:
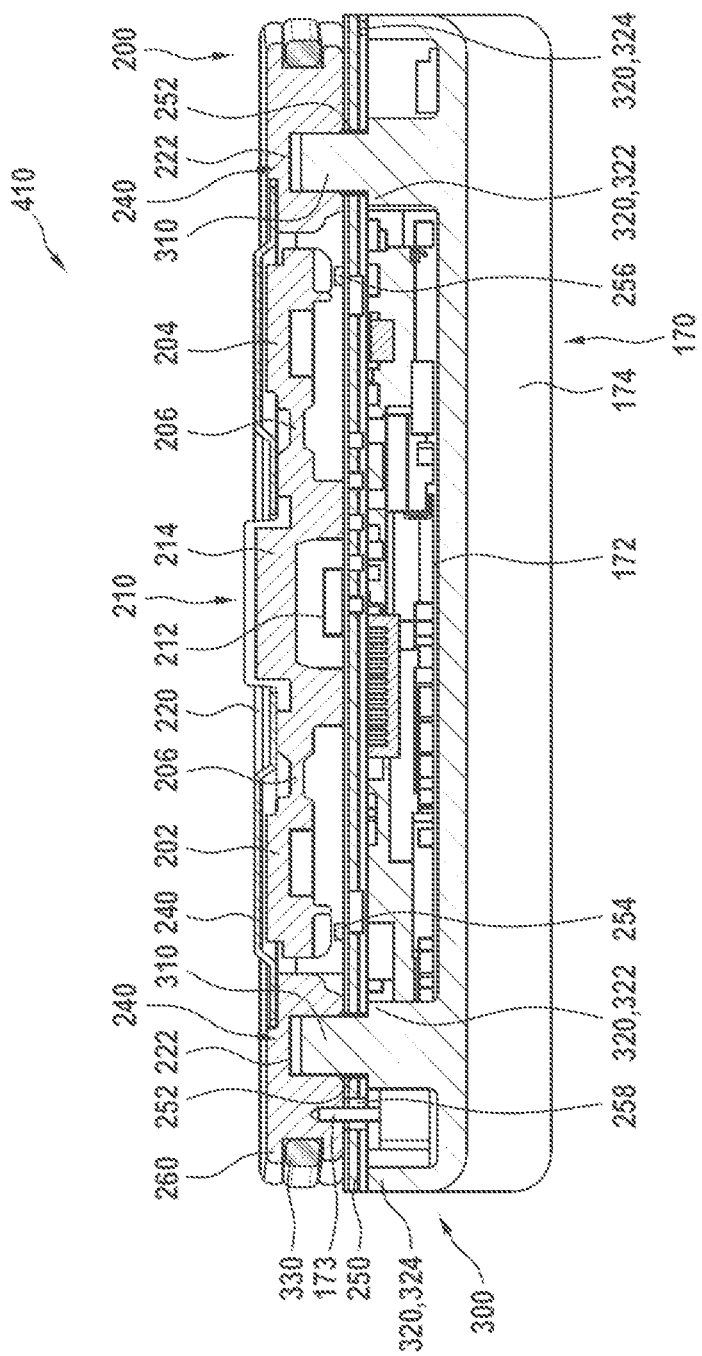
FIG. 3 a cross-sectional view of the user interface with a positioning device according to the disclosure.

FIG. 3 shows a cross-sectional view 410 of the user interface 200 with a positioning device 300 according to the disclosure and the control unit 170. The positioning device 300 supports the user interface 200 on the control-unit housing 174. The user interface 200 in this case bears against the positioning device 300. Additionally, the positioning device 300 locates the user-interface 200 relative to the control-unit housing 174 and positions the user-interface 200 in a relative position. The control-unit housing 174 is provided to locate the control unit 170 in the housing 110, the control-unit housing 174 is exemplarily shaped in the manner of a cup, see also FIGS. 4 to 6.

The positioning device 300 comprises at least one positioning element 310. Realized here, as an example, are two positioning elements 310, which are shaped in the manner of a pin. The positioning element 310 is provided for locating the user-interface 200 so as to at least partially overlap the control unit 170. Here, the user-interface 200 at least partially overlaps the control-unit housing 174. The positioning element 310 locates the user-interface 200 substantially parallel to the control unit 170. The positioning element 310 engages at least partially in the user interface 200.

Here, the user-interface 200 comprises at least one receiver 240, with two receivers 240 realized here as an example. The positioning element 310 engages at least partially in the receiver 240. In doing so, the positioning element 310 realizes a positive connection to the receiver 240 of the user interface 200.

Figure 4:
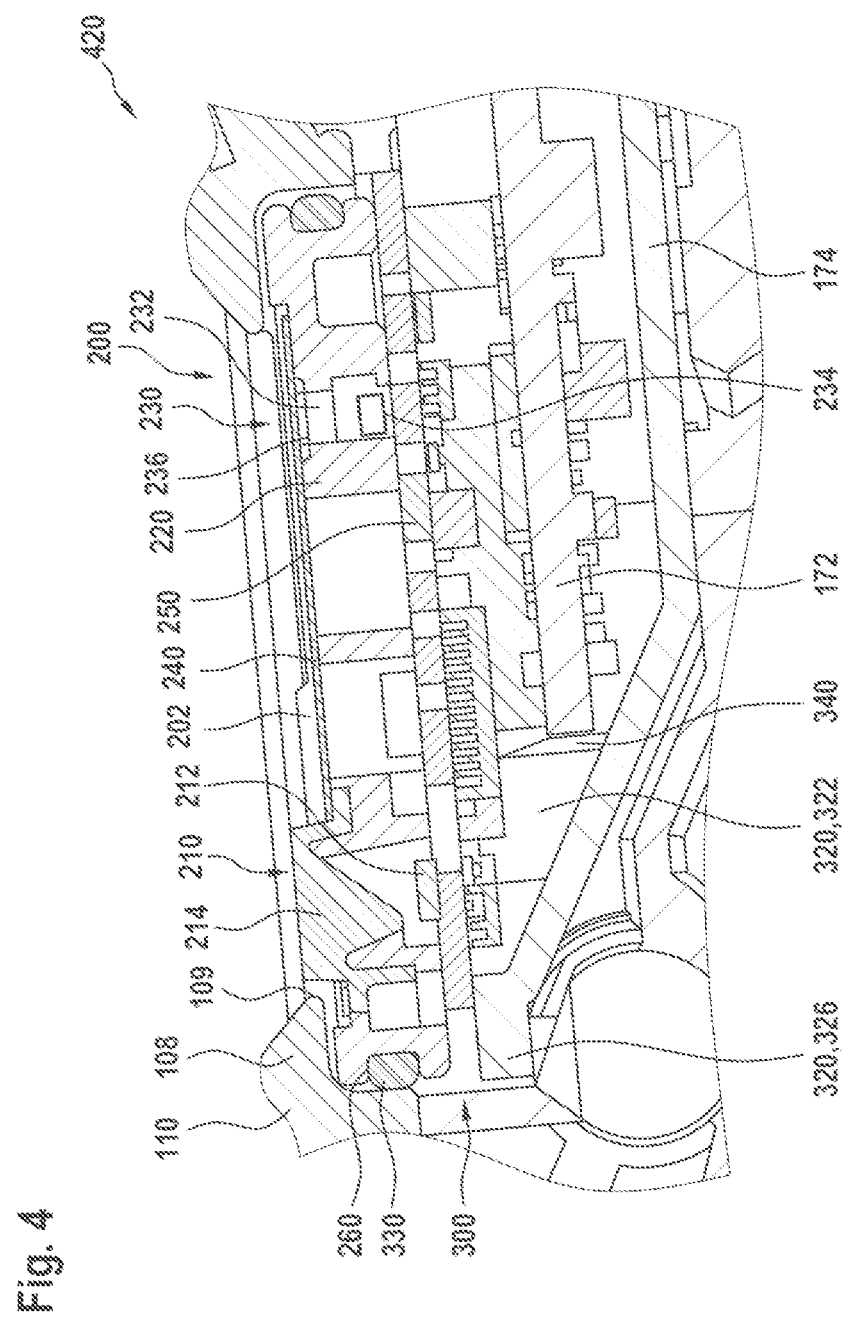
FIG. 4 a longitudinal sectional view of the user interface with the positioning device according to the disclosure.

The user interface 200 includes a user-interface circuit board 250, see also FIGS. 4-6. The user-interface circuit board 250 has at least one through-opening 252, with two through-openings 252 formed as examples. The positioning element 310 extends through the through-opening 252. The through-opening 252 is realized here, for example, by means of a through-hole. The through-opening 252 is formed here in a circular shape. Here, the positioning element 310 realizes a positive connection to the through-opening 252.

The user-interface circuit board 250 comprises a switching element 254 and a further switching element 256. The switching element 254 and the further switching element 256 are each exemplarily realized here as a pushbutton. The switching element 254 is designed to be actuated by the operating element 202. The further switching element 256 is designed to be actuated by the further operating element 204. The workspace illumination unit 210 comprises at least one light element 212, exemplarily realized here as an LED. Here, the light element 212 is located on the user-interface circuit board 250. Further, the workspace illumination unit 210 comprises a light-guide element 214, exemplarily realized here as a focusing lens.

The user-interface 200 comprises a carrier element 220. Here, the user-interface 200 thus comprises the carrier element 220 and the user-interface circuit board 250. The carrier element 220 has at least one receiving element 222, with two receiving elements 222 being formed here as an example. The positioning element 310 engages in the receiving element 222 of the carrier element 220. The positioning element 310 thereby realizes a positive connection to the receiving element 222 of the carrier element 220. Here, the receiving element 222 is exemplarily realized as a cup-like receiver.

Here, the receiving element 222 is formed in one piece with the carrier element 220. Here, the carrier element 220 comprises the indicator element 230, the light-guide element 214 of the workspace illumination unit 210, the operating element 202, and the further operating element 204. Here, as an example, the carrier element 220 is moulded around the light-guide element 214 and the indicator element 230. Here, the operating element 202 and the further operating element 204 are formed in one piece with the carrier element 220. The operating element 202 and the further operating element 204 each comprise a restoring element 206. The restoring element 206 allows the operating element 202 and the further operating element 204 to be guided into at least one neutral position. In the neutral position, the operating element 202 and the further operating element 204 can be actuated. The restoring element 206 is formed as at least one spring element. The restoring element 206 forms a hinge-type lever with the operating element 202 and the further operating element 204, respectively.

The positioning device 300 comprises at least one support element 320. Here, the positioning device comprises, as an example, five support elements 320, see also FIGS. 4-6. In this case, the user-interface circuit board 250 bears against the support element 320. The support element 320 is designed to divert any occurring operating forces into the housing 110. The support element 320 is operatively connected to the housing 110 and is supported on the housing 110, see also FIG. 4-6. The support element 320 in this case bears against the control-unit housing 174. The control-unit housing 174 is operatively connected to the housing 110 and bears against the housing 110, see also FIGS. 4-6. The five support elements 320 are formed here as two circumferential shoulders 322, as two edges 324 and as a projection 326, see also FIGS. 4 and 5. Here, the positioning element 310 and the support element 320, realized as a circumferential shoulder 322, are formed in one piece.

The control-unit housing 174 forms the positioning device 300. The control-unit housing 174 in this case forms the positioning element 310 and the support element 320, realized as the circumferential shoulder 322, as the edge 324 and as the projection 326. Here, the control-unit housing 174 is formed in one piece with the positioning element 310 and the support element 320.

The user-interface circuit board 250 is connected in an electrically conductive manner to the control-unit circuit board 172, see also FIG. 5c. The user-interface circuit board 250 comprises at least one opening 258 for the control-unit circuit board 172. The control-unit circuit board 172 comprises at least one pin 173 for the user-interface circuit board 250. The pin 173 for the user-interface circuit board 250 is designed to engage the opening 285 for the control-unit circuit board 172. Moreover, the pin 173 for the user-interface circuit board 250 is soldered to the user-interface circuit board 250 by means of the opening 258 for the control-unit circuit board 172.

Here, the user-interface circuit board 250 includes a plurality of openings 258 for the control-unit circuit board 172, for example five. The control-unit circuit board 172 comprises a plurality of pins 173 for the user-interface circuit board 250, for example five. The plurality of openings 258 for the control-unit circuit board 172 matches the plurality of pins 173 for the user-interface circuit board 250.

Represented in FIG. 4 is a longitudinal sectional view 420 of the user-interface 200 with the positioning device 300 according to the disclosure. The positioning device 300 comprises a further positioning element 330 for centering the user-interface 200 relative to a housing opening 109. The user-interface 200 comprises a connection element 260. The connection element 260 of the user-interface 200 is designed to receive the further positioning element 330. The housing 110 comprises the housing opening 109, the housing opening 109 being realized next to the stand base 162 of the housing 110. The housing opening 109 is exemplarily formed here in a polygonal shape, see also FIG. 2. The further positioning element 330 is exemplarily realized here as an O-ring. The connection element 260 receives the further positioning element 330, such that the further positioning element 330 bears against the connection element 260. The connection element 260 realizes a positive connection to the further positioning element 330. Here, the connection element 260 is exemplarily realized as a circumferential groove.

The positioning device 300 comprises at least one delimiting element 340, there being two delimiting elements 340 realized here. The control-unit circuit board 172 bears against the delimiting element 340. The delimiting element 340 is designed to locate the control-unit circuit board 172 relative to the user-interface 200. The delimiting element 340 is exemplarily realized here as a rib.

Here, the control-unit housing 174 also forms the delimiting element 340, in addition to the positioning element 310 and the support element 320. Moreover, here the control-unit housing 174, the positioning element 310, the support element 320 and the delimiting element 340 are formed in one piece.

The housing 110 projects at least partially over the user interface 200. Here, the housing 110 comprises a circumferential projection 108, see also FIG. 2. The housing 110 is designed to locate the user-interface 200 between the housing 110 and the control unit 170. Here, the carrier element 200 comprises an operator control membrane 224, see also FIGS. 2, 3 and 5a. The operator control membrane 224 comprises control icons. The control icons are designed to indicate items of information relating to the hand-held power tool, such as rotational speed levels or operating modes, to the user. The projection 108 of the housing 110 projects over the user-interface 200. The housing 110 has a plurality of compression ribs, not represented in greater detail. A force is applied to the user interface 200 by the plurality of compression ribs in a direction towards the control unit 170.

The indicator element 230 comprises a light-guide element 232 in the form of a focusing lens, at least one light element 234, here exemplarily realized as an LED, an information indicator element 236 in the form of a light strip, rotational-speed level indicator elements 235 and operating-mode indicator elements 238, see also FIGS. 5a and 5c. Here, seven light elements 234 are provided, three light elements 234 being assigned to the speed step indicator elements 235, two light elements 234 being assigned to the operating-mode indicator elements, and two light elements 234 being assigned to the information indicator element 236, see also FIG. 5c.

Represented in FIG. 5a is a perspective view of carrier element 220. Represented in FIG. 5b is a perspective view of control-unit housing 174. FIG. 5c shows a perspective view of the control-unit circuit board 172 with the user-interface circuit board 250.

Figure 6A:
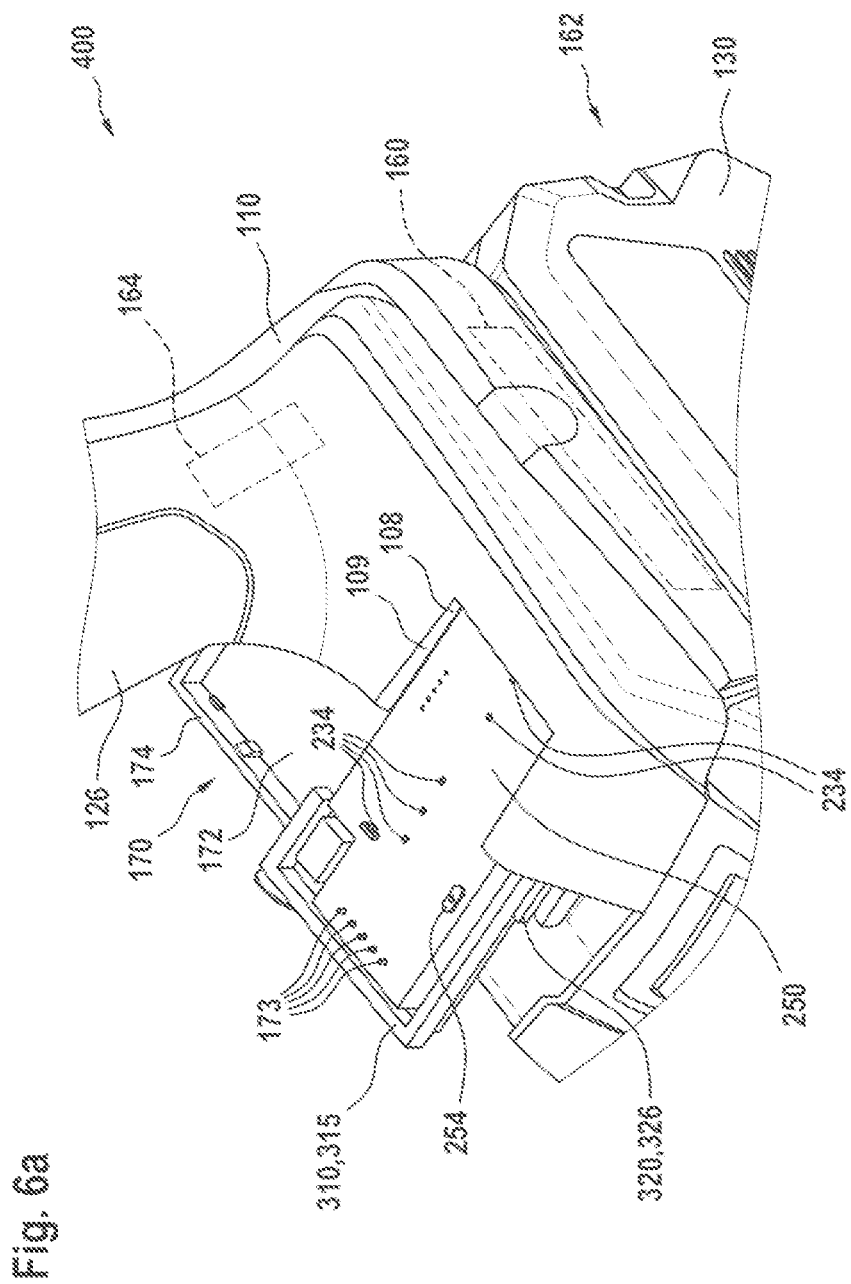
FIG. 6a a perspective sectional view of the hand-held power tool with an alternative embodiment of the positioning device.
Figure 6B:
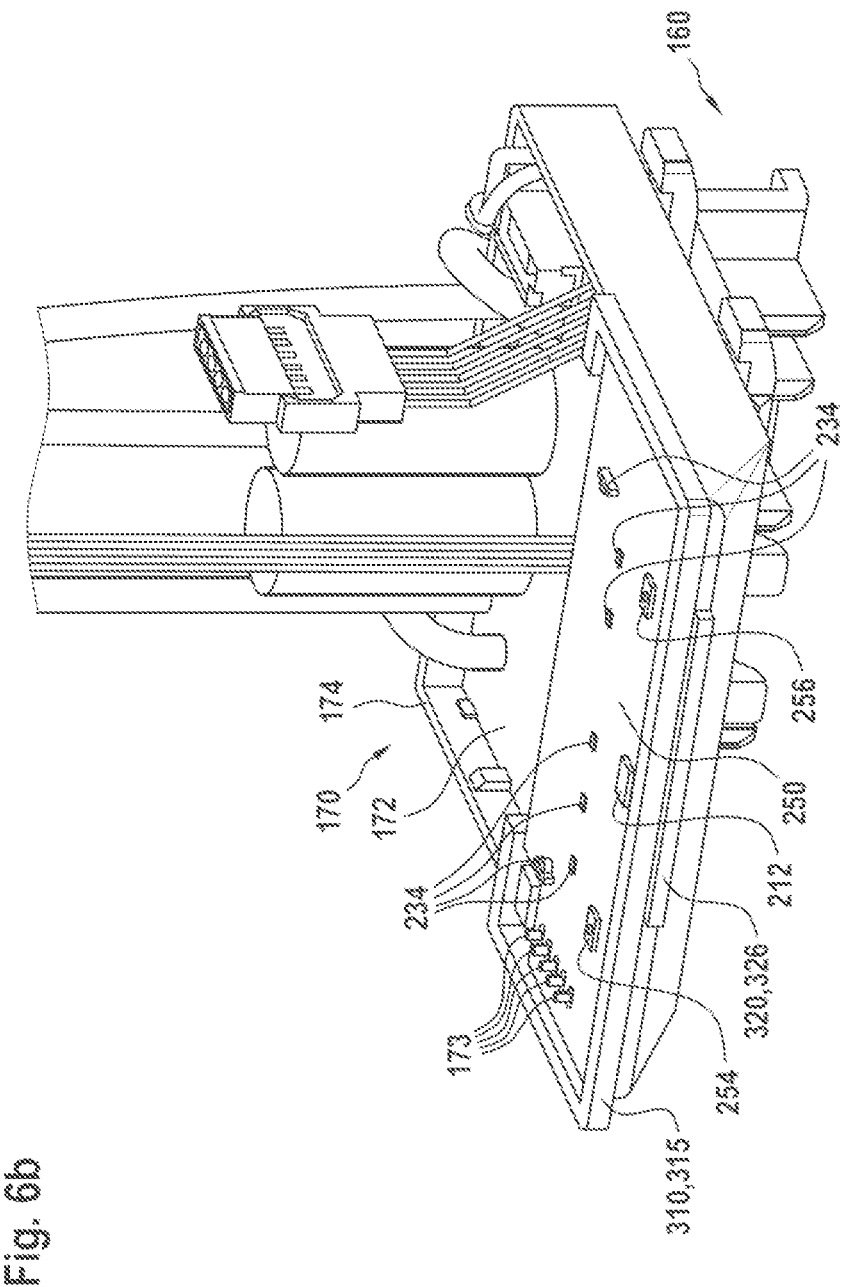
FIG. 6b a perspective view of the alternative embodiment of the positioning device.

Represented in FIG. 6 is an alternative embodiment of the positioning device 300. FIG. 6a in this case shows a perspective sectional view of the hand-held power tool 100 with the detail 400 having the alternative embodiment of the positioning device 300. In the alternative embodiment, the positioning element 310 at least partially encompasses the user-interface 200. Here, the positioning element 310 at least partially encompasses the user-interface circuit board 250. The positioning element 310 realizes a positive connection to the user-interface circuit board 250. FIG. 6b shows a perspective view of the alternative embodiment of the positioning device 300. In this case, the positioning element 310 is formed as an at least partially circumferential frame 315.

The invention claimed is:
1. A hand-held power tool comprising:
a drive unit configured to be actuated by at least one manual switch;

a control unit configured to control at least the drive unit, the control unit having a control-unit housing;

at least one user interface comprising at least one operating element;

a housing at least partially accommodating the control unit and the at least one user interface; and a positioning device that supports the at least one user interface on the control-unit housing, wherein:

the positioning device has at least one delimiting element;

the control unit comprises a control-unit circuit board that bears against the at least one delimiting element; and the at least one delimiting element is configured to locate the control-unit circuit board relative to the at least one user interface.

2. The hand-held power tool according to claim 1, wherein the positioning device has at least one positioning element configured to locate the at least one user interface so as to at least partially overlap the control unit.

3. The hand-held power tool according to claim 2, wherein the at least one positioning element engages at least partially in the at least one user interface.

4. The hand-held power tool according to claim 3, wherein the at least one user-interface has a user-interface circuit board defining at least one through-opening, and the at least one positioning element is configured to extend through the at least one through-opening.

5. The hand-held power tool according to claim 3, wherein the user interface has at least one carrier element comprising at least one receiving element, and the at least one positioning element engages in the at least one receiving element of the at least one carrier element.

6. The hand-held power tool according to claim 3, wherein the at least one positioning element includes a pin.

7. The hand-held power tool according to claim 1, wherein the positioning device includes at least one positioning element that at least partially encompasses the at least one user interface.

8. The hand-held power tool according to claim 7, wherein the at least one positioning element includes an at least partially circumferential frame.

9. The hand-held power tool according to claim 1, wherein the positioning device has at least one support element against which the user interface bears, and the at least one support element is configured to divert occurring operating forces into the housing.

10. The hand-held power tool according to claim 1, wherein the positioning device has a further positioning element configured to center the at least one user interface relative to a housing opening, the at least one user interface having a connection element configured to receive the further positioning element.

11. The hand-held power tool according to claim 1, wherein the control-unit housing forms the positioning device.

12. The hand-held power tool according to claim 1, wherein the at least one user interface is connected in an electrically conductive manner to the control unit.

* * * * *